(12) United States Patent
Hodgkinson (10) Patent No.: US 7,168,357 B2
(45) Date of Patent: Jan. 30, 2007

(54) SECURITY MONITORING AND ENFORCEMENT SYSTEM

(76) Inventor: Ian Hodgkinson, 10 Meadow Lane, Conondale, Queensland, 4552 (AU)

( * ) Notice: Subject to any disclaimer, the term of this patent is extended or adjusted under 35 U.S.C. 154(b) by 232 days.

(21) Appl. No.: 10/489,871

(22) PCT Filed: Sep. 16, 2002

(86) PCT No.: PCT/AU02/01275

§ 371 (c)(1),
(2), (4) Date: Mar. 17, 2004

(87) PCT Pub. No.: WO03/025876

PCT Pub. Date: Mar. 27, 2003

(65) Prior Publication Data

US 2004/0246131 A1  Dec. 9, 2004

(51) Int. Cl.
*F41A 23/56* (2006.01)
*B64D 7/06* (2006.01)
(52) U.S. Cl. .................. 89/1.11; 89/41.05; 89/41.08; 89/37.07; 89/37.21; 348/153
(58) Field of Classification Search ............. 89/1.11, 89/41.05, 37.21, 41.08, 37.07, 37.13; 348/153, 348/154, 155
See application file for complete search history.

(56) References Cited

U.S. PATENT DOCUMENTS

| 4,644,845 | A | * | 2/1987 | Garehime, Jr. ............. 89/41.05 |
| 5,195,448 | A | | 3/1993 | Sims |
| 5,473,501 | A | * | 12/1995 | Claypool .................... 361/232 |
| 5,503,059 | A | * | 4/1996 | Pacholok ..................... 89/1.11 |
| 5,531,344 | A | | 7/1996 | Winner |
| 5,588,398 | A | | 12/1996 | Allen, II et al. |
| 5,747,719 | A | | 5/1998 | Bottesch |
| 5,962,806 | A | | 10/1999 | Coakley et al. |
| 6,269,726 | B1 | * | 8/2001 | McNulty, Sr. ............... 89/1.11 |

FOREIGN PATENT DOCUMENTS

| DE | 195 04 084 A1 | 8/1996 |
| FR | 2 728 993 | 7/1996 |

\* cited by examiner

*Primary Examiner*—Stephen M. Johnson
(74) *Attorney, Agent, or Firm*—Workman Nydegger (57) ABSTRACT

A security monitoring and enforcement system is provided for monitoring and enforcing control in a secure environment, such as an aircraft. The system includes a security monitoring and enforcement unit (SMEU) having a visual surveillance system and an audio surveillance and communication system. The visual surveillance system is mounted to an enforcement system and housed in a ceiling of an aircraft. The SMEU is remotely operated and monitored by remote control system located on the ground. The security monitoring and enforcement system is operable continuously or when a security breach is detected. The enforcement system is activated and fired to subdue a suspect.

22 Claims, 6 Drawing Sheets

SECURITY MONITORING AND ENFORCEMENT SYSTEM

TECHNICAL FIELD

The present invention relates to a security system and in particular to a security system having enforcement means remotely controlled and activated by authorised personnel.

BACKGROUND OF THE INVENTION

Security is of great concern in our everyday life. More and more work places are providing secure work environments using visual monitoring and by the presence of security personnel. The unwanted presence of a suspicious individual in the work place or public places of security presents a risk to the safety of the public.

In the case of aircraft security, a highjacker presents a significant risk to the passengers and crew. In these cases, terrorists and criminals can take hostages and create very difficult security situations.

Numerous solutions have been put forward to address the problem of apprehending suspects, in a highjack situation for example. Current agencies employ a guard or Marshall present in every flight. However, the major drawback of having guards on aircrafts is the risk in enforcing their authority in a security breach situation through firearms. The risk of damage to the fuselage is significant as rapid depressurisation may occur. The risk to the safety of passengers is also very high.

A further problem is the guards are more than likely to be outnumbered and the possibility of them being killed as the first act by highjackers is high. Furthermore, the weapons used by the guards may become inadvertently available to the highjackers.

Another known system of diffusing a security breach is the injection of sleeping gas into the passenger compartment of an aircraft. The effect of the sleeping gas is that all the passengers and quite possibly the crew as well are immobilised. A further drawback is highjackers are likely to have gas masks in anticipation of such security measures.

In other situations requiring the apprehension of suspects, security dogs may be used. U.S. Pat. No. 5,588,398 describes a remotely controlled dog muzzle. A dog muzzle apparatus is attached to a dog having a stun gun fitted with the muzzle. The stun gun is used with police dogs for apprehending and subduing suspects and is operated remotely by authorised personnel. The dog having the muzzle comes in contact with the suspect to immobilise the suspect by the electric charge in the stun gun.

Although the above system removes the risk of injury to the authorised personnel by the remote operation of the stun gun, the police dog, however, must come in contact with the suspect. There is a substantial risk, the suspect may injure and incapacitate the dog through use of firearms or other weapons. The muzzle with the stun gun is then ineffective.

The use of security dogs having stun guns attached to them, in the workplace or aircraft, is impractical and unsafe.

OBJECT OF THE INVENTION

It is an object of the invention to provide a system which overcomes at least one drawback of the above systems.

It is a further object of the invention to provide a remotely operated monitoring and enforcement system.

SUMMARY OF THE INVENTION

In one form, although it need not be the only or indeed the broadest form, the invention resides in a system for monitoring and enforcing control in an environment where security is desired, said system comprising:

monitoring means for monitoring the status of said security environment;

enforcement means for expelling immobilising means at a target to immobilise said target; and remote control means remotely controlling the activation of the enforcement means if a security breach is detected in said environment.

In a preferred form of the invention, the enforcement means includes a stun gun. The immobilising means may include stun cartridges expelled from the barrel of said stun gun to immobilise the target with high electric charge.

The immobilising means may also include tranquilliser darts, conventional arrows or gas pellets.

The stun gun is preferably adjustably mounted in a housing in said environment.

Preferably, the system includes a receiver means for receiving remote control signals from said remote control means to operate said monitoring and enforcement means.

The monitoring means includes visual and audio surveillance means.

Preferably, the visual means includes at least one video camera adjustably mounted to the stun gun in said housing and coupled to a transmitter for transmitting video signals to said remote control means.

Preferably, the audio means includes a microphone and speaker coupled to a transmitter and mounted in said housing. Said audio means provides two-way communication with said remote control means.

The video camera is preferably rotated with the stun gun to enable aiming and zooming at said target. Said video camera may be remotely activated periodically or when a security breach is detected.

Preferably the remote control means wirelessly controls the monitoring and enforcement means.

Preferably the remote control means includes a transmitter for transmitting a control signal to said receiver means of the monitoring and enforcement means.

The control signal is preferably a coded signal, which is decoded in said receiver means, of said monitoring and enforcement means.

The transmitter is preferably a radio transmitter transmitting said coded signal to control the operation of said monitoring and enforcement means. A processing means operable by a human operator preferably provides command signals which are transmitted to said monitoring and enforcement means.

In another form of the invention there is provided a security monitoring and enforcement system for use on an aircraft, said system comprising:

monitoring means for monitoring the security status of said aircraft;

enforcement means fitted to said aircraft for expelling immobilising means at a target to immobilise said target; and remote control means remotely controlling the activation of the enforcement means if a security breach is detected in said aircraft.

Preferably a plurality of the monitoring and enforcement means is mounted the aircraft.

Preferably said enforcement means includes a stun gun. The stun gun may include one or more barrels.

Preferably, said immobilising means include stun cartridges which are expelled from the barrel of said stun gun to immobilise a target with high electric charge.

The enforcement means is mounted on a rotating carriage so that said stun gun may be rotated to aim at said target.

Preferably, the enforcement means includes a receiver means for receiving remote control signals from said remote control means to operate said monitoring and enforcement means.

Preferably an aperture formed between said carriage and a mounting plate attached to a surface of the aircraft allows the stun gun to fire into the passenger compartment without interference.

The aperture may be provided with sensors to indicate if the aperture is blocked or tampered with.

Preferably, the monitoring means includes visual and audio means.

The visual and audio means can be remotely controlled and operated by said remote control means, periodically or when security is breached in said aircraft.

Said visual and audio means can include at least one video camera, a microphone and a speaker coupled to a transmitter.

The video camera is preferably mounted to and rotated with the stun gun to enable aiming and zooming at a target.

Preferably, the remote control means wirelessly controls the monitoring and enforcement means.

Preferably the remote control means includes a transmitter for transmitting a control signal to said monitoring and enforcement means.

The transmission is preferably a coded signal, which is decoded in said receiver means of said monitoring and enforcement means.

The transmitter is preferably a ground station radio transmitter transmitting said coded signal to control the operation of said monitoring and enforcement means. A processing means operable by a law enforcement operator preferably generates command signals which are transmitted to said ground station radio transmitter for uplink to said monitoring and enforcement means.

In yet another form of the invention there is provided a remotely operated stun gun for use with a security system, said stun gun comprising:

at least one barrel for housing an immobilising means;

actuation means for expelling said immobilising means at a target to immobilise said target; and remote control means remotely controlling the actuation of said actuation means.

DESCRIPTION OF THE PREFERRED EMBODIMENT

In a preferred form of the invention, the invention will be described with reference to a security monitoring and enforcement system used with an aircraft. However, it should be noted that the invention can also be applied in other security environments such as, banks, airport terminals, hospitals and the like. The invention may also be used with existing alarm and security systems in homes or other environments where security is desired.

Figure 5:
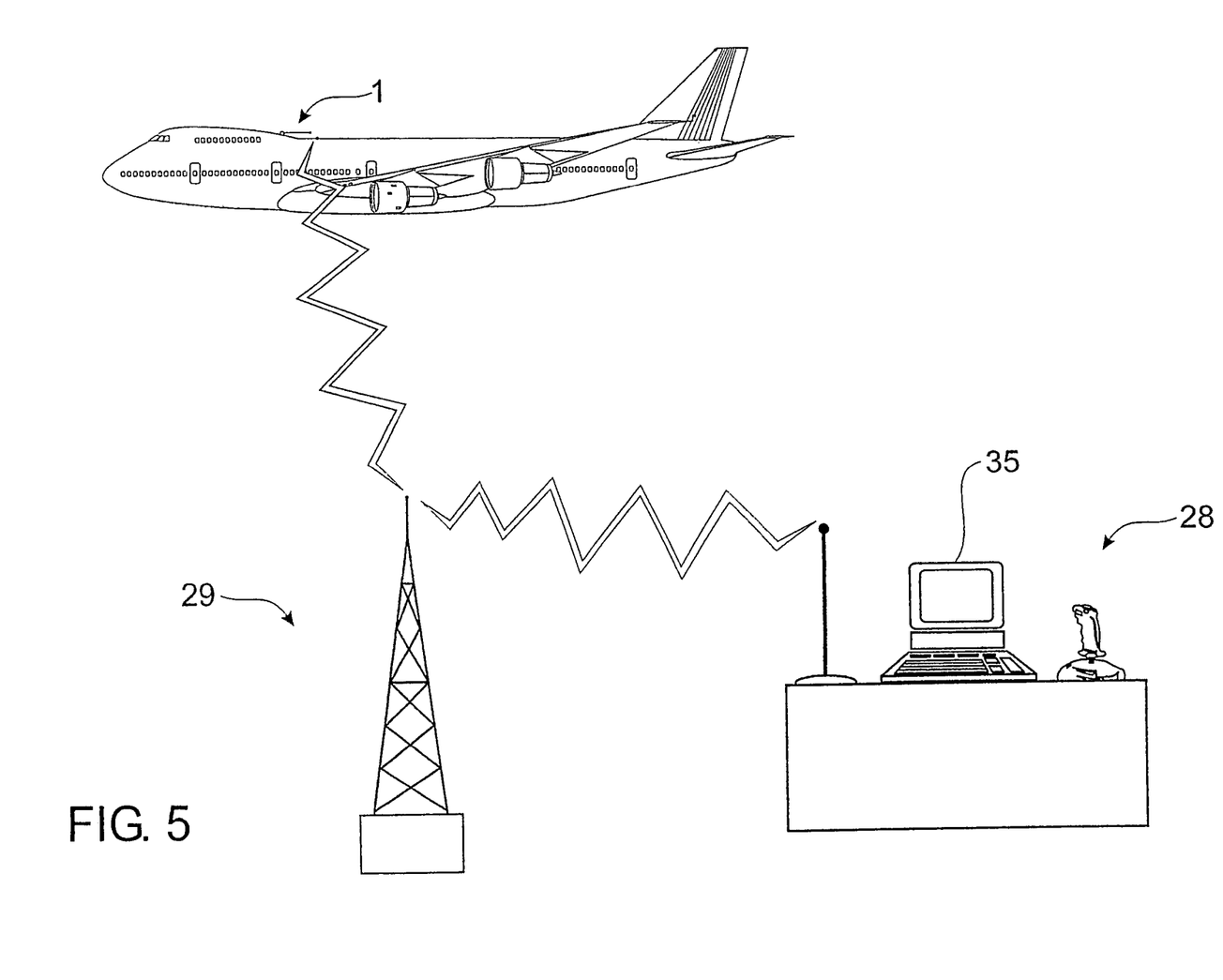
FIG. 5 is a schematic illustration of a security monitoring and enforcement system in accordance with the invention.

In a preferred form of the invention, there is generally shown in FIG. 1 a security monitoring and enforcement unit (SMEU) 1 for use in a security monitoring and enforcement system in accordance with the invention. The SMEU 1 comprises monitoring means including a video camera 2, microphone and speaker unit 3 and an enforcement means 4. In the present embodiment the enforcement means is a stun gun for expelling immobilising means 5. A remote control means as shown in FIG. 5 remotely controls the operation of the camera 2, mic and speaker unit 3 and stun gun 4. The remote operation of the SMEU 1 in a security monitoring and enforcement system will be described in detail later.

Figure 1A:
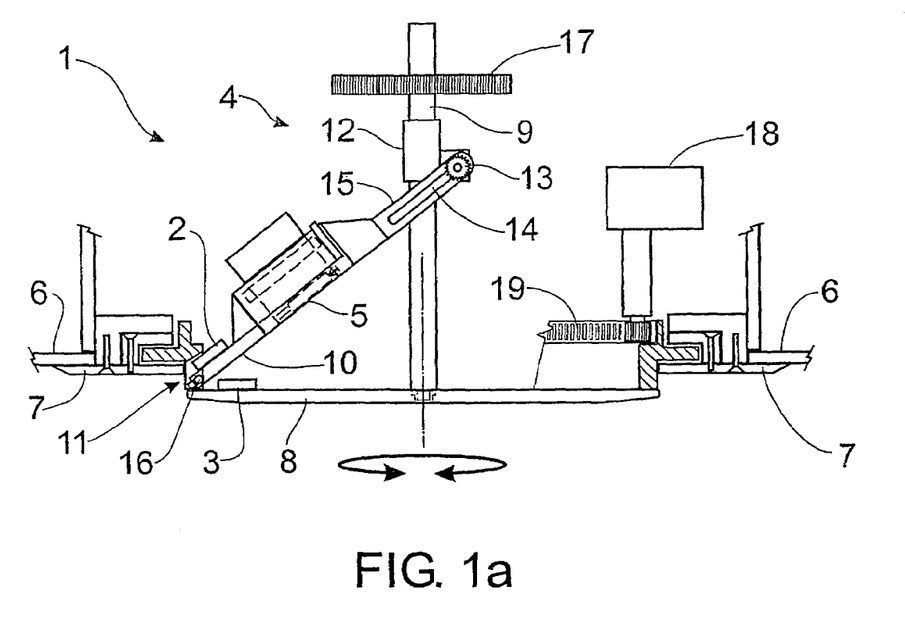
FIGS. 1a to 1c are embodiments of various orientations of a security monitoring and enforcement unit (SMEU) in accordance with the invention.
Figure 1B:
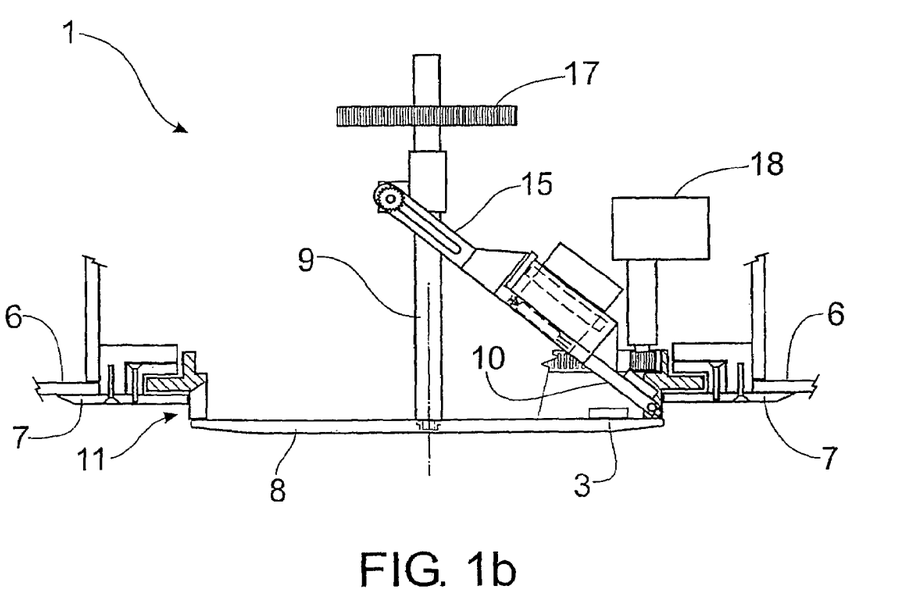
Figure 1C:
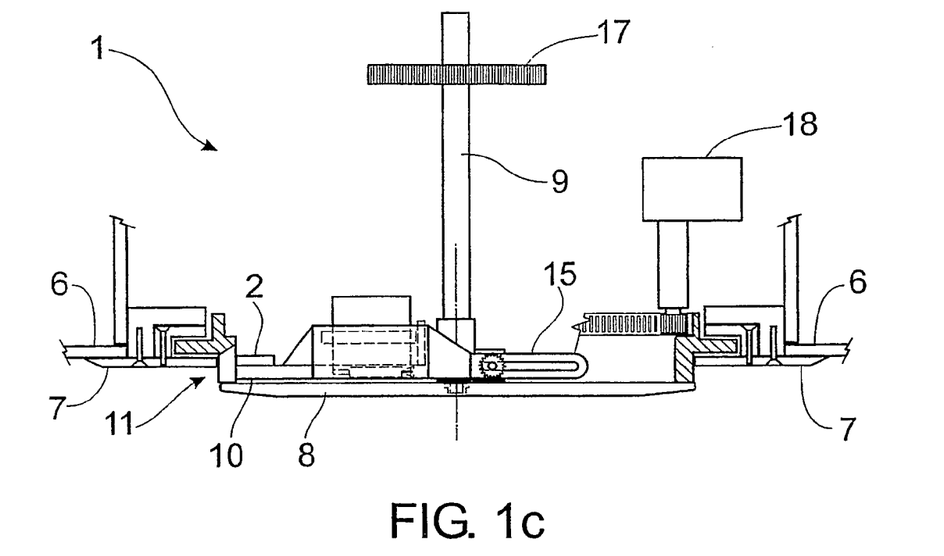

FIG. 1a shows one direction of the stun gun 4. FIGS. 1b and 1c show examples of other alternative directions of the stun gun 4.

In the present embodiment SMEU 1 is fitted in an aircraft as part of a security monitoring and enforcement system. Referring to FIG. 1a, SMEU 1 is mounted into a ceiling panel 6 of an aircraft. SMEU 1 can be placed anywhere it is desirable to have monitoring and enforcement capability in the aircraft. Ideally, the passenger compartment and the cockpit is appropriate since any security breach, such as attempted highjacking is likely to occur in these areas.

A mounting plate 7 allows the SMEU 1 to be mounted to the ceiling panel 6. A direction motor 18 rotates a rotating carriage 8 via a pinion and ring gear drive 19. Carriage 8 supports stun gun 4 having a barrel 10 and video camera 2. The barrel 10 and video camera 2 are disguised inside aperture 11 between the mounting plate 7 and rotating carriage 8 such that no one can see which direction the barrel and camera is pointing. The camera 2 and barrel 10 point out through the aperture 11 so that the camera can capture visual images and aid in the aiming of the barrel at potential targets. The aperture is continuous around the carriage 8 so that the stun gun can be pointed in any direction.

A mounting block 12 with internal screw thread is propelled by screw action up and down the matching threaded shaft 9 as it rotates. The height of the block is set by direction and the amount of rotation of shaft 9, which is driven by a trajectory motor 17 or other suitable means. The mounting block 12 includes a pivot 13 that slides in slot ~14 in the extension arm 15 of the barrel 10. The barrel 110 and camera 2 also pivot on pivot point 16 attached to carriage 8.

In operation the barrel 10 can be adjusted from the horizontal as shown in FIG. 1c to an angle in the vertical plane as shown in FIGS. 1a and 1b by the operation of trajectory motor 17.

Figure 2:
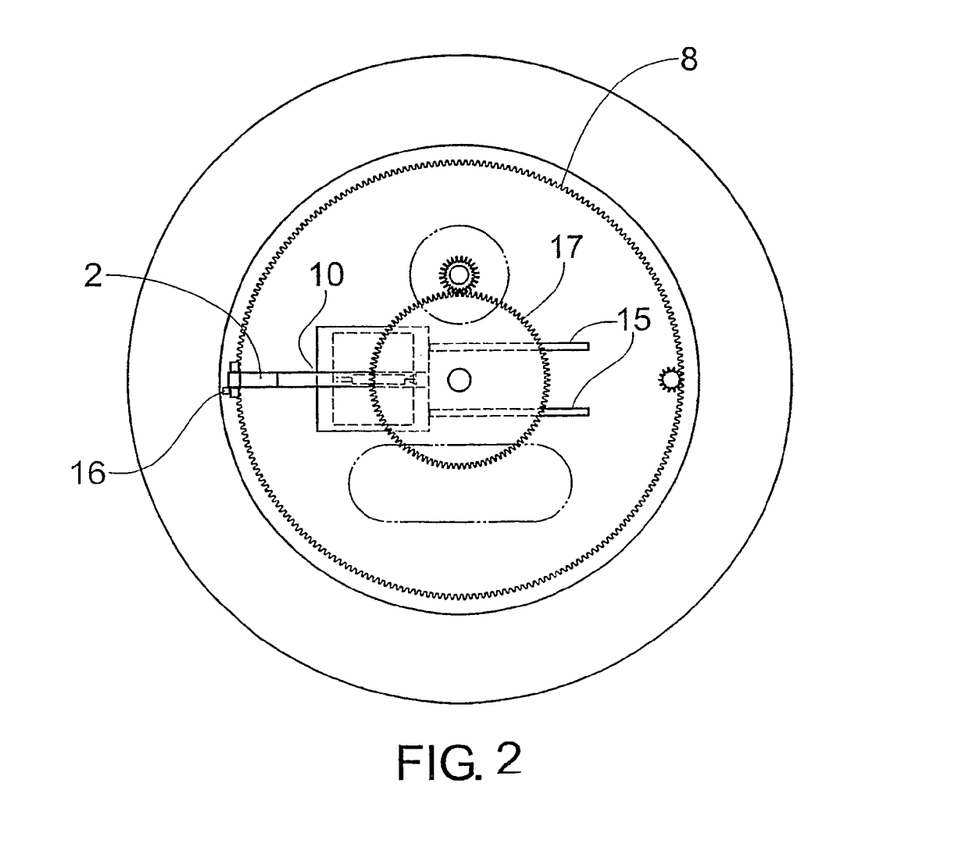
FIG. 2 is a plan view of a security monitoring and enforcement unit.

Referring to FIG. 2 there is shown a plan view of SMEU 1. Carriage 8 can be rotated via direction motor 18 driving through a pinion and ring gear drive 19 as shown in FIG. 1, or other suitable translation means commonly known in the art. The rotation of the carriage 8 enables aiming of the barrel 10 in the horizontal plane.

The SMEU 1 includes transmitter and receiver means 30, 31 (FIG. 6) for receiving remote control signals to operate the SMEU. The operation of stun gun 4 is determined based on the visual and audio information transmitted by the monitoring means to the remote control means 28.

In this embodiment, the remote control means is a wireless remote control. However, in other applications such as in buildings, the remote control can be hardwired.

In the embodiment described with reference to an aircraft, the SMEU can be provided with a plurality of cameras. Additional cameras can be placed around carriage 8 to provide fill in views for a complete 360° view. One or more of these cameras is associated with barrel 10 of stun gun 4 to assist in aiming using crosshairs and adjustable zoom, to accurately target a highjacker. The remaining cameras provide a 360° view to a remote operator to enable them to view other parts of the aircraft and behind the highjacker.

In a further embodiment, SMEU can be provided with multiple firing barrels in stun gun 4. The multiple barrels facilitate numerous immobilising means to be fired at varying angles. The plurality of cameras provides aiming and zooming capabilities for the further barrels.

The SMEU having camera 2 requires an aperture 11 through which the passenger compartment of an aircraft can be viewed, as discussed earlier. A tamper sensor (not shown) can be provided to detect if the aperture is blocked or the SMEU is tampered with thereby blinding the camera 2 and barrel 10 of the SMEU. The sensor can be in the form of each photo or light sensors to detect light reduction. In the event, a low light level is sensed, then an automatic alarm condition is indicated. Once activated by the light sensor, the SMEU automatically activates and operates a set of blades to cut through whatever is blocking the aperture.

Figure 3:
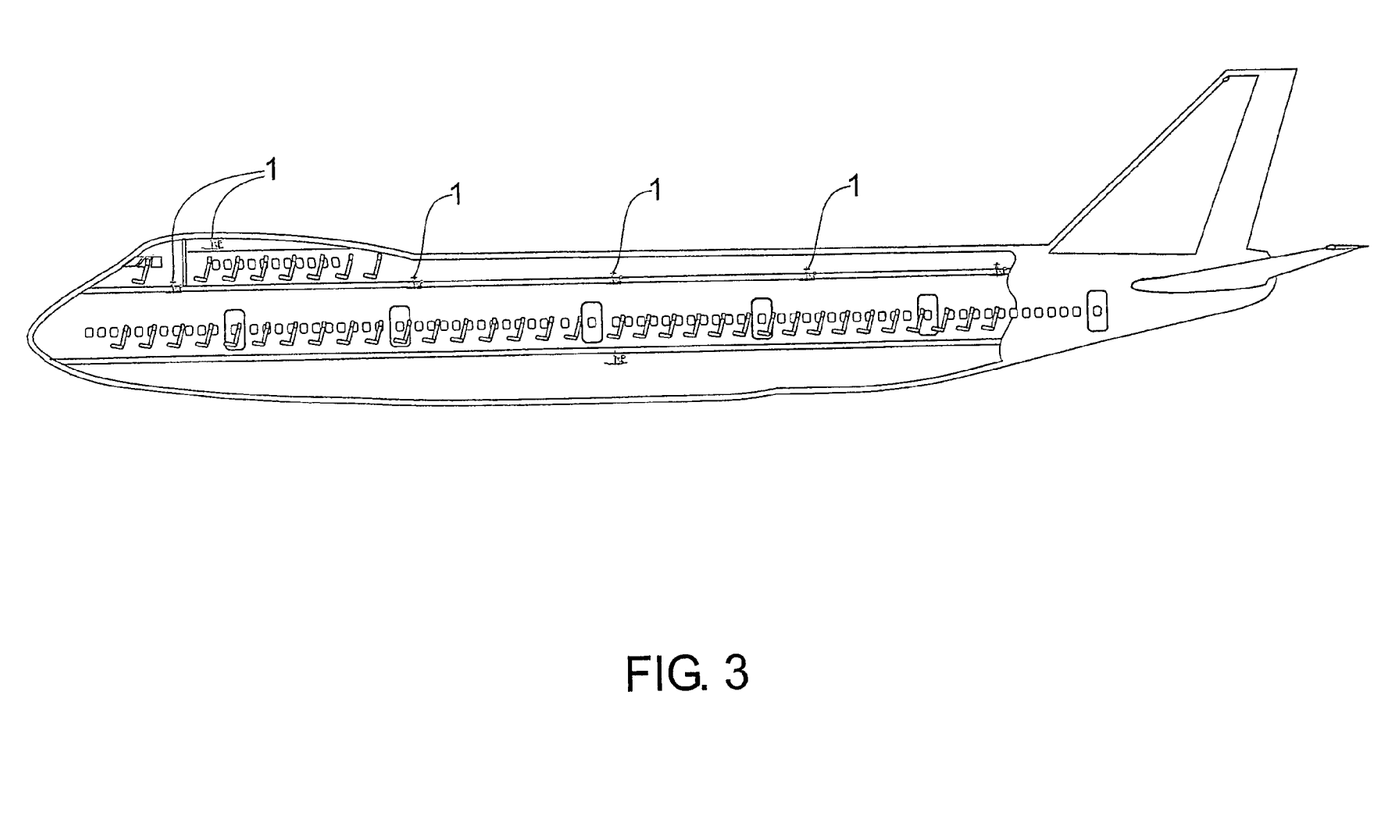
FIG. 3 is a sectional view of an aircraft having a plurality of security and monitoring enforcement units.

A plurality of SMEUs can be placed in various parts of the aircraft as shown FIG. 3. Once a tamper condition is determined at one SMEU, all other SMEUs are activated automatically by the remote control means to allow immobilising means to be fired by other SMEUs at the tamperer.

It is possible to have automatic activation of other SMEUs without reverting to the remote control means.

Each SMEU of a plurality of SMEUs mounted in an aircraft is an independent system, so that if one SMEU is immobilised other SMEUs remain operable and active.

The SMEU of the present invention uses a stun gun expelling immobilising means. The immobilising means can include any suitable means which immobilise a suspect target rather than killing the target. The present invention is realised by the use of a stun cartridge which is expelled from the stun gun to a target, such as a highjacker. Other immobilising means such as gas pellets or darts can be used with the stun gun.

Figure 4A:
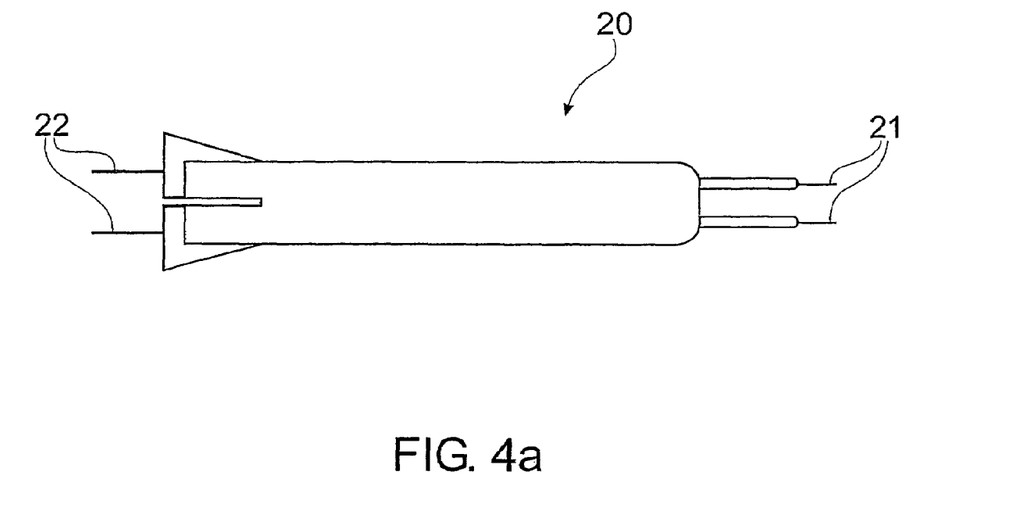
FIG. 4a is a schematic of a stun cartridge used in a security monitoring and enforcement unit.

FIG. 4a shows a stun cartridge 20 which is used with the SMEU of the present invention. The cartridge 20 has two probes 21 which upon impact on a target, complete an electrical circuit and discharge a high voltage into the target. The high voltage may be stored in the SMEU in a suitable battery using capacitive storage, with two thin wires 22 providing power connection to the cartridge from the SMEU. A current sensor can be provided to detect the above discharge of current which then activates a forced ejection of the wires from barrel 10, so that another cartridge may be positioned in the barrel ready to be fired by the SMEU.

A suitable stun cartridge presently available is provided by TASER® International which can expel a cartridge up to 7 meters.

In an alternate embodiment, other types of darts such as tranquilliser darts may be used. It is necessary that the dart contains the toxin or chemical until impact with a target. This is primarily for safety reasons as well as to ensure no chemical breakdown of the chemical can occur due to the absence of air and oxygen.

Figure 4B:
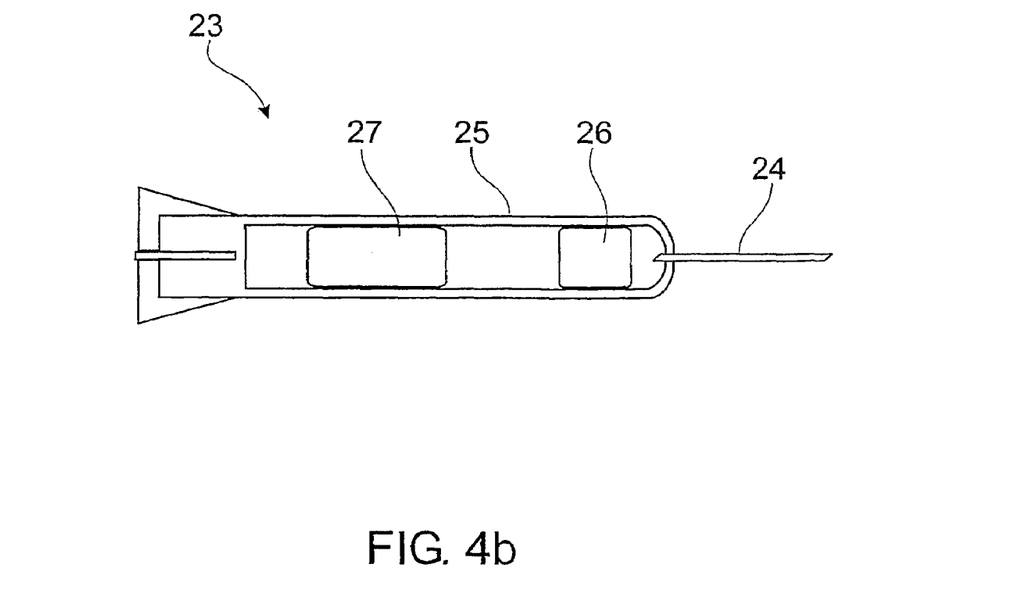
FIG. 4b is a schematic of a tranquilliser dart used in security monitoring and enforcement unit.

Referring now to FIG. 4b there is shown a tranquilliser dart 23. A hypodermic type needle 24 capable of penetrating a bullet proof vest, is moulded into a plastic body 25. Inside the plastic body 25 there is a thin plastic membrane bag 26 containing the tranquillising chemical. A movable weight 27 is placed behind the membrane bag 26.

Upon impact of the dart with the body of a suspect target, the needle 24 penetrates the skin. The plastic body 25 is suddenly stopped at the skin of the target causing sudden deceleration of the dart. The moveable weight 27 under the forces of inertia, moves forward to push the membrane bag 26 thereby forcing the chemical contained within to be injected into the target by needle 24. Other mechanisms for achieving the same result would be readily known to a person skilled in the art.

In an alternate form, "arrow" type darts can be used. These darts comprise of a solid aerodynamic arrow designed to penetrate a targets body.

Figure 6:
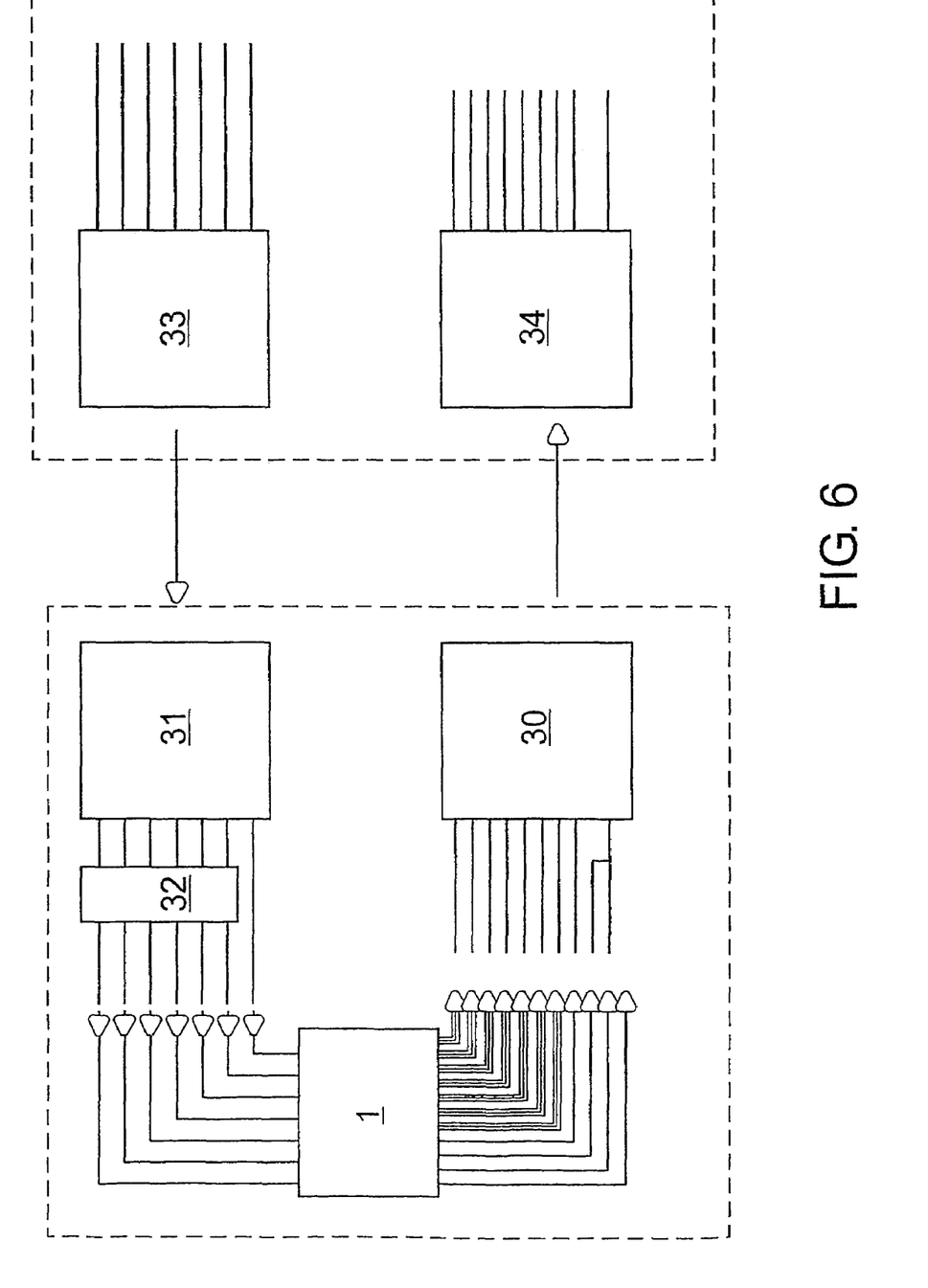
FIG. 6 is a block diagram of the transmitter and receiver units of the security monitoring and enforcement system of FIG. 5.

Referring now to FIGS. 5 and 6, the operation of the SMEU in a security monitoring and enforcement system will be described. Remote control means 28 is a wireless remote control, which transmits a coded signal via ground station radio transmitters 29 to receivers 31 on an aircraft for each SMEU1 on-board. The transmission signal is a conventional radio transmission signal capable of communicating with aircraft communication systems, such as those used in air-traffic control. The transmission signal is encoded with control information for various functions of the monitoring and enforcement means in each SMEU. Ideally, the transmission signal is encrypted using standard encryption techniques used in commercial and military applications so that the operation of the SMEUs is not tampered with.

In this embodiment, the remote control 28 is a wireless control station located on the ground and operated by law enforcement authorities. However, it is possible to have an aircraft based wireless remote control means, such as on the same aircraft as the SMEUs or other military aircraft. Alternatively, the remote control can be ocean based on a vessel, such as military ship. In a further alternate embodiment, the remote control can be hardwired to control the operation of the remotely controlled SMEU in building applications, such as banks, airport terminals and the like.

Remote control 28 includes a processor 35 operated by a law enforcement operator or other authorised personnel to control the functions of the SMEU. The processor can be realised by a computer terminal using conventional display means to display video signals and audio signals transmitted by each SMEU on an aircraft which is being monitored.

Referring now to FIG. 6, the remote control 28 transmits encoded control signals via its transmitter 33 to control the operation of the SMEU. The control signals can include commands such as: activate microphone; activate cameras; zoom camera; control trajectory and direction of stun gun; firing control of stun gun. A receiver 31 of the SMEU receives the encoded signal and a processor 32 decodes the encoded signals into electrical command signals for operation of the SMEU. In this way, the speaker, microphone, cameras and stun gun is activated and controlled to operate the SMEU. A joystick can be used with computer terminal 35 to provide direction control of the cameras. The joystick is also used for direction control of the stun gun and firing of darts.

The SMEU transmits video, audio, activation and tamper signals via transmitter 30 which is received at receiver 34 of the remote control 28. The computer terminal 35 displays the video images captured by the SMEUs as well as audio relating to the passenger compartment. The video images comprise continuous real-time or near real time images from various cameras and angles associated with each SMEU. Conventional television transmission technology, or an accepted adaptation of it, or any suitable audio and video capture software can be used to display the images, as it would be known to a person skilled in the art.

The operation of the SMEUs can be continuous thereby constantly transmitting to remote control 28, where the security status of an aircraft is monitored. Any breach of security is captured by the video cameras and microphone. Law enforcement operators can then locate any perpetrators on the aircraft using the video cameras, and subdue them by firing the stun guns. The law enforcement operators may engage in two-way communication with the suspects via the microphone and speaker in each SMEU.

The system allows real time audio and video surveillance of the passenger compartment in an aircraft as well as real time remote electronic firing control of immobilisation darts.

Alternatively, the SMEU may be inoperable until a security breach in the aircraft is alerted to law enforcement operators at remote control 28. Emergency activation can be realised in numerous ways including activation by the Pilot in the cockpit, by Flight Attendants using a remote keyring type controller, by cellular or mobile phone communication to ground authorities or by excessive noise levels in the passenger compartment.

In a further embodiment, if the remote control becomes non-functional due to poor weather conditions, the SMEUs may be automatically activated and operated by the Pilot and Co-Pilot in the cockpit to monitor an control the security situation in the passenger compartment.

In a tamper protection mode, the SMEU is activated automatically and allows law enforcement operators at the remote control 28 to capture a video image of the tamperer's face, warn the tamperer and if necessary fire immobilising darts.

The SMEU can also incorporate over ride prevention control so that it cannot be stopped, by anyone on the aircraft other than the law enforcement operators at remote control 28. In this embodiment intimidation of air crew or Pilots will not stop the system.

The invention has been described with reference to exemplary embodiments. However, it should be noted that other embodiments are envisaged within the spirit and scope of the invention.

The invention claimed is:

1. A device for monitoring and enforcing control in an environment where security is desired, the device comprising:
a mounting plate attachable to a surface;
a carriage rotatable with respect to the mounting plate and forming an aperture between the mounting plate and the carriage;
means for expelling immobilizing means mounted on the carriage so as to be concealed behind the surface, said immobilizing means being expelled at a target through the aperture;
means for monitoring a security status of the environment; and
means for receiving remote control signals for activating the means for expelling if a security breach is detected.

2. The device of claim 1 further comprising means for sensing a blockage of the aperture.

3. The device of claim 1 wherein the immobilizing means includes cartridges that immobilize the target with high electric charge.

4. The device of claim 1 wherein the immobilizing means includes tranquilliser darts, conventional arrows or gas pellets.

5. The device of claim 1 wherein the means for expelling is mounted on the carriage so as to be adjustable in elevation.

6. The device of claim 1 wherein the means for monitoring comprises means for visual and audio surveillance.

7. The device of claim 1 wherein the means for receiving receives wireless signals from a means for remotely controlling.

8. The system of claim 7 wherein the means for remotely controlling comprises a transmitter for transmitting the remote control signals to the means for receiving.

9. The device of claim 7 wherein the means for remotely controlling comprises means for processing operable by a human operator which provides command signals that are transmitted to the means for receiving.

10. The device of claim 7 wherein the means for monitoring comprises at least one video camera adjustably mounted to the means for expelling and coupled to a transmitter for transmitting video signals to said means for remotely controlling.

11. The device of claim 7 wherein the means for monitoring comprises a microphone coupled to a transmitter for transmitting audio signals to said means for remotely controlling.

12. The device of claim 11 further comprising a speaker coupled to a receiver for two-way communication with the means for remotely controlling.

13. The device of claim 1 wherein the means for monitoring comprises a plurality of video cameras providing a 360 degree view of the environment.

14. The device of claim 13 wherein at least one of the plurality of cameras is rotatable with the means for expelling to assist with aiming of the means for expelling.

15. The device of claim 1 wherein the means for monitoring is remotely activated periodically or when a security breach is detected.

16. The device of claim 1 wherein the remote control signals are coded signals, which are decoded in said means for receiving.

17. A security monitoring and enforcement system for an aircraft comprising a plurality of devices for monitoring and enforcing control, each device comprising:
a mounting plate attached to an internal surface of the aircraft;
a carriage rotatable with respect to the mounting plate and forming an aperture between the mounting plate and the carriage;
means for expelling immobilizing means mounted on the carriage so as to be concealed behind the surface, said immobilizing means being expelled at a target through the aperture;
means for monitoring a security status of the aircraft; and
means for remotely controlling the activation of the means for expelling if a security breach is detected.

18. The system of claim 17 wherein the means for remotely controlling includes a transmitter for transmitting a control signal to the means for expelling.

19. The system of claim 18 wherein the control signal is a coded signal.

20. The system of claim 18 wherein the transmitter is a ground station radio transmitter transmitting the control signal to control the operation of the means for expelling.

21. The system of claim 20 wherein a means for processing operable by a law enforcement operator generates command signals which are transmitted to the ground station radio transmitter for uplink to the means for expelling.

22. A security monitoring and enforcement system for use on an aircraft, said system comprising:
   means for monitoring the security status of said aircraft;
   a stun gun having one or more barrels, the stun gun being adapted to expel stun cartridges from a barrel of said stun gun to immobilize a target with high electric charge, said stun gun being mounted on a rotating carriage in said aircraft so that said stun gun may be rotated to aim at said target; and
   means for remotely controlling the activation of the stun gun if a security breach is detected in said aircraft,
   wherein an aperture formed between said carriage and a mounting plate attached to a surface of the aircraft allows the stun gun to fire into a passenger compartment without interference, said aperture being provided with sensors to indicate if the aperture is blocked or tampered with.

* * * * *